United States Patent
Bhatia et al.

(10) Patent No.: US 6,614,447 B1
(45) Date of Patent: Sep. 2, 2003

(54) METHOD AND APPARATUS FOR CORRECTING OPACITY VALUES IN A RENDERING PIPELINE

(75) Inventors: Vishal C. Bhatia, Arlington, MA (US); Charidimos E. Gasparakis, Acton, MA (US); Larry D. Seiler, Boylston, MA (US)

(73) Assignee: TeraRecon, Inc., San Mateo, CA (US)

(*) Notice: Subject to any disclaimer, the term of this patent is extended or adjusted under 35 U.S.C. 154(b) by 489 days.

(21) Appl. No.: 09/679,316

(22) Filed: Oct. 4, 2000

(51) Int. Cl.$^7$ ............................... G09G 5/02
(52) U.S. Cl. ..................... 345/592; 345/610
(58) Field of Search .................. 345/592, 589, 345/610, 768, 603

(56) References Cited

U.S. PATENT DOCUMENTS 5,625,374 A * 4/1997 Turkowski ............... 345/592
6,466,220 B1 * 10/2002 Cesana et al. ............ 345/603

OTHER PUBLICATIONS

Pllilippe Lacroute and Marc Levoy, Fast Volume Rendering Using a Shear–Warp Factorization of the Viewing Transformation, Proc. SIGGRAPH' 94, orlando, Florida, Jul., 1994, pp. 451–458.*

Lacroute et al.; "Fast Volume Rendering Using a Shear–Warp Factorization of the Viewing Transformation"; Computer Systems Laboratory, Stanford University. Technical Report: CSL–TR–95–678, Sep. 1995.

* cited by examiner

*Primary Examiner*—Matthew Luu
(74) *Attorney, Agent, or Firm*—Blakely, Sokoloff, Taylor & Zafman LLP

(57) ABSTRACT

A method corrects opacity values of samples in a rendering pipeline. The method partitions a range of uncorrected alpha values into a plurality of segments in a low to high order. Corrected alpha values for uncorrected alpha values in the highest segment are determined by direct table look-up. Corrected alpha values for uncorrected alpha values in all but the highest segment are determined by linear interpolation.

20 Claims, 3 Drawing Sheets

METHOD AND APPARATUS FOR CORRECTING OPACITY VALUES IN A RENDERING PIPELINE

FIELD OF THE INVENTION

The present invention relates generally to computer graphics systems that blend color values and, more particularly, to a hardware rendering pipeline that determines opacity values.

BACKGROUND OF THE INVENTION

In rendering systems, blending, or compositing as it is sometimes known, is a process that combines RGB color values of source samples with RGB color values of corresponding destination samples. The combined RGB values are typically stored in an image buffer. In volume rendering systems, the RGB color values of the samples are interpolated from voxel values.

An opacity ($\alpha$) value associated with the RGB values controls how much of the color values of the destination samples should be combined with those of the source samples. Without blending, the color values of the source samples overwrite the values of the destination samples, as though the source samples are opaque. With blending, it is possible to control how much of the existing destination color values should be combined with those of the source samples. Blending enables effects such as translucent images. Color blending lies at the heart of techniques such as transparency and digital compositing.

One way to understand blending operations is to consider the RGB values of the samples as representing their color, and the $\alpha$ values as representing their transparency or opacity. Levels of transparency range from completely transparent to somewhat transparent (translucent) to opaque. In standard computer graphics systems that employ blending, $\alpha$ has a value between 0 and 1. If $\alpha=0$, the sample is transparent, and if $\alpha=1$, the sample is opaque. If $\alpha$ has some value between 0 and 1, the sample is translucent.

If the rendering system uses ray casting, the number of samples that are generated along a ray can vary depending on viewing angle, for example, non-orthogonal projections may have a different number of samples than orthogonal projections. Also, the volume samples may be non-uniformly spaced because samples along the x, y, and z axes were acquired at different rates, as in anisotropic volumes.

Using the wrong number of samples can be a problem. If the number of samples is greater than it should be, the resulting image can be too opaque. If the number of samples is less than it should be, the resulting image can be too translucent. In other words, the translucency of the final image varies with the number of samples.

Often the number of samples cannot be controlled, so accurate rendering requires correcting the opacity at samples to account for the sample spacing. Therefore, there is a need to perform opacity correction, and more particularly, to perform opacity correction in a hardware rendering pipeline.

SUMMARY OF THE INVENTION

A method corrects opacity values of samples in a rendering pipeline. The method partitions a range of uncorrected alpha values into a plurality of segments in a low to high order. Corrected alpha values for uncorrected alpha values in the highest segment are determined by direct table look-up. Corrected alpha values for uncorrected alpha values in all but the highest segment are determined by linear interpolation.

DETAILED DESCRIPTION OF THE PREFERRED EMBODIMENT

Figure 1:
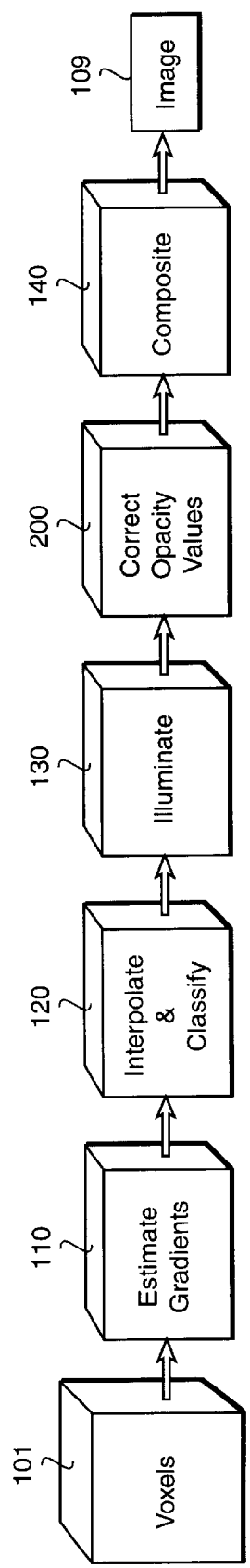
FIG. 1 is a block diagram of a volume rendering pipeline that uses the invention.

FIG. 1 shows a rendering pipeline 100 that uses opacity correction according to the invention. The pipeline converts a volume data set (voxels) 101 to an image 109 of pixels. The pipeline 100 includes a gradient estimation stage 110, an interpolation and classification stage 120, an illumination stage 130, and a compositing stage 140.

Prior to compositing 140, the final value of the opacity of each sample is corrected for the spacing of samples along rays. Alpha values are maintained as fractional values in the range [0, ..., 1]. Each alpha value represents the opacity at a position in space, relative to an expected spacing to the next sample. Lacroute, in "*Fast Volume Rendering Using a Shear Warp Factorization of the Viewing Transformation,*" Stanford University, Technical Report CSL,TR-678, 1995 teaches that the following Equation may be used to compute alpha from the sample spacing, dZ, and an "extinction coefficient", $\Phi_i$, which measures the transmission of light at a given point i along a ray:

$$\alpha = 1 - e^{\Phi_i dZ}. \qquad [1]$$

This equation is equivalent to computing the translucency, $1-\alpha$, as follows:

$$1-\alpha = e^{\Phi_i dZ}. \qquad [2]$$

If spacing of the sample points is the same as the size of this small region, dZ, then the alpha values can simply be accumulated along each ray to obtain the total opacity. However, if the spacing of sample points along rays is different that the size of the region for which alpha is defined, then a corrected alpha value must be used. Let the corrected spacing be m*dZ, then the formula for the corrected alpha is given below.

$$1-\alpha_{corrected} = e^{\Phi_{im}*dZ} = (1-\alpha_{sample})^m \qquad [3]$$

$$\rightarrow \alpha_{corrected} = 1-(1-\alpha_{sample})^m \qquad [4]$$

Note that it is not sufficient to correct the alpha value. In some cases colors are pre-multiplied by the sample alpha in order to avoid interpolation artifacts. These opacity-weighted colors must be adjusted by dividing out the sample alpha and then multiplying by the corrected alpha.

$$f_c = \frac{1-(1-\alpha_{sample})^m}{\alpha_{sample}} \qquad [5]$$

where m is the ratio of the spacing of sample points along the ray relative to a "base" spacing by which alpha values were originally defined. That is, if dZ is the original sample spacing, then m*dZ is the corrected sample spacing.

The corrected value of $\alpha_{sample}$ is given by $$\alpha_{corrected} = f_c \times \alpha_{sample} = 1-(1-\alpha_{sample})^m \qquad [6]$$

In the case that color values have previously been weighted by opacity, the corrected color values are given by $$\text{color}_{corrected} = \text{color}_{sample} \times f_c. \quad [7]$$

Note that Equation 7 corrects color components by "undoing" the opacity weighting that was previously applied, i.e., the denominator off $f_c$ in Equation 5, and then multiplying the color by the corrected opacity of Equation 4.

Also note that if m=1, then $f_c$=1. As m increases above one, $f_c$ also increases to form a non-linear curve; that is, a values must be increased to reflect samples that are spaced farther apart. Conversely, as m decreases below one, $f_c$ decreases to form a different non-linear curve, approaching zero as samples are spaced more and more closely together.

Figure 3:
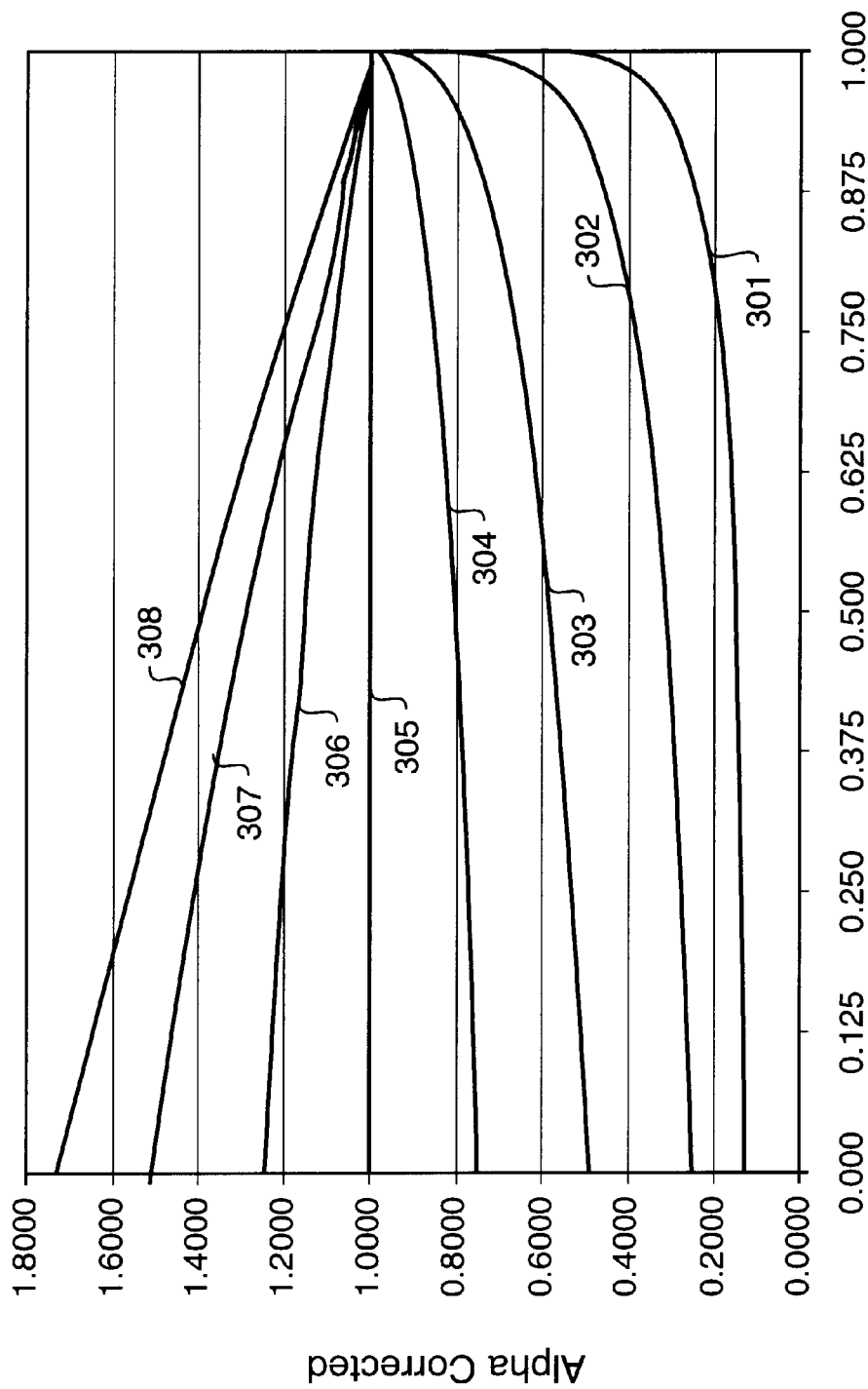
FIG. 3 is a graph of corrected opacity values.

FIG. 3 shows a graph of uncorrected and corrected alpha values produced for different values 301–308 of m, respectively m=0.125,0.25,05,0.75,1.0,1.25,1.5, and 1.732 ($\sqrt{3}$). The value of m will typically change with view direction or changes in sample spacing due to supersampling, anisotropy, etc. Note that as the sample alpha value approaches zero, $f_c$ approaches m, so Equation 5 may be substituted with $f_c$=m for $\alpha_{sample}$=0. When $\alpha_{sample}$=0, then the corrected alpha and corrected opacity weighted colors are all zero, regardless of the value off $f_c$.

Note that Equation 1 involves exponentiation. This is a costly operation, so in traditional software and hardware implemented rendering systems, alpha correction is performed, if it is performed at all, by means of a table lookup. This can still be expensive in a hardware renderer, particularly for a 12-bit or larger alpha values and particularly if multiple copies of the table are required in order to compute multiple samples in parallel. Therefore, in a hardware pipeline, an alternative scheme is desirable.

Figure 2:
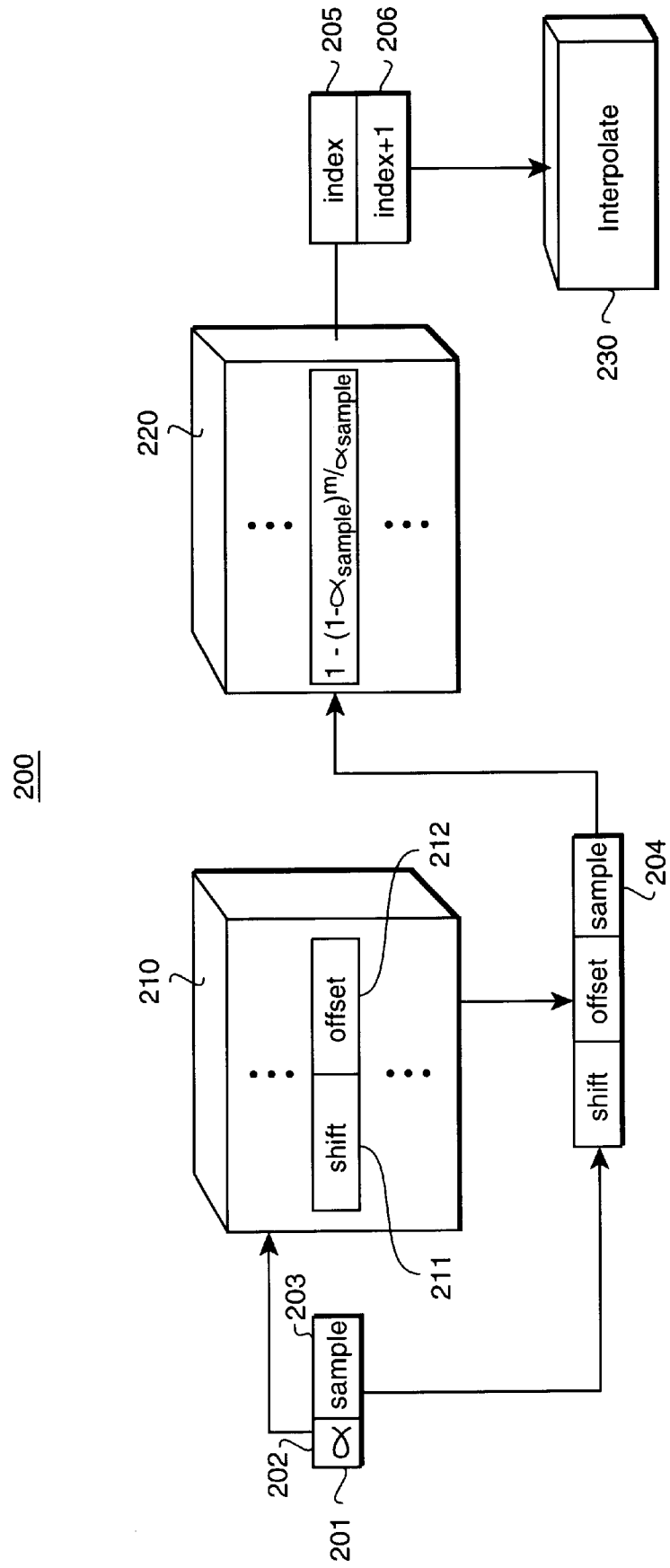
FIG. 2 is a block diagram of an opacity correction stage of the pipeline of FIG. 1.

In order to calculate the correction factor efficiently, the invention uses a two-stage set of lookup tables 200, as shown in FIG. 2. The lookup tables are loaded based on the value of m for a given volume rendering operation. The value of m is constant over the volume, provided that the sample spacing is the same for each ray, so loading the tables for a single value of m suffices.

A first stage 210 partitions the range of alpha values into sixteen segments, and the second stage 220 provides an approximation within each segment by linear interpolation, as described below. This greatly reduces the hardware logic required to implement a highly accurate alpha correction lookup table. This method allows an accurate result due to the nature of the correction factor. As seen in FIG. 3, different values of m produce long, relatively long flat section of a curve for most opactity values and a short section of significant curvature for only a small range of the highest opacity values.

Therefore, the first stage 210 includes a table that has sixteen entries in the preferred embodiment. These sixteen entries will approximate the corrected opacity value for the long flat section of the curve. Each entry includes a shift 211 and an offset 212 value. The second stage 220 has ninety-six entries in the preferred embodiment. These are for the short highly curved section. Each entry in the second table is a value for:

$$f_c = (1-(1-\alpha_{sample})^m)/\alpha_{sample}$$

which is the correction factor for an $\alpha_{sample}$ corresponding to that index, as well as being the correction factor for opacity weighted colors.

The first stage 210 receives as input the four high-order bits 202 of $\alpha_{sample}$ 201. These bits are used as an index into table 210 to obtain shift 211 and offset 212 values. The two values 211–212 are combined with the low-order eight bits 203 $\alpha_{sample}$ 201 to produce an index 204 into the second table 220

$$\text{index} = \text{offset} + ((\alpha_{sample} \ \& \ 0\text{x}\textit{ff})\text{>>shift})$$

The low-order bits, i.e., $\alpha_{sample}$ & 0xff, are shifted right by Shift and added to offset to obtain an index into the second table 220.

Indexing table 220 causes the two entries 204 at index 205 and index+1 206 to be fetched. The two entries are interpolated 230 as follows, where table 2[i] specifies element i in the second level table:

$$\text{weight} = (\alpha_{sample} \ \& \ (2^{Shift}-1)).$$

$$\text{interp} = \text{table } 2[\text{index}+1] \times \text{weight} + \text{table } 2[\text{index}] \times (2^{shift}-\text{weight}).$$

In words, the low-order shift bits of the sample's opacity value are used as a weight to interpolate between adjacent entries of the table 220. In the preferred embodiment, the second level table stores fixed point values with 12 bits of fixed point precision. That is, a value of 4096 in the second level table represents a correction factor of one.

Then, each color component, e.g., red, green, and blue, is corrected by:

$$\text{color}_{corrected} = (\text{color}_{sample} \times (\text{interp>>Shift})) \text{>>}12.$$

Similarly, the corrected alpha value is computed as:

$$\alpha_{corrected} = (\alpha_{sample} \times (\text{interp>>Shift})) \text{>>}12.$$

In both of these equations, interp is shifted right by shift bits to produce an interpolated correction factor with the same range as the correction factors that were indexed from the table. The product is then shifted right by 12 bits since a value of 4096 in the second level table actually represents a correction factor of one.

Because the alpha correction Equation 5 is highly non-linear, linear interpolation does not work well for the highest few values of alpha. Accordingly, values of $\alpha_{sample}$ that exceed a predetermined threshold can be treated separately. Instead of interpolating between two adjacent table entries as above, each alpha value higher than the threshold has its own entry in the second stage table. In the preferred embodiment, this threshold level is set at 4072, so that the highest 24 alpha values (4072..4095), corresponding to the short highly curved section, have their own entries in the second stage table. Specifically, entries 72..95 provide $\alpha_{corrected}$ values for $\alpha_{sample}$=4072..4095. In other words, the corrected alpha values are determined by direct look-up, instead of by interpolation.

Appendix A includes a program for generating tables according to this invention. This program assumes fixed shift and offset values, as well as a fixed threshold for directly looking up corrected alpha values. The program fills in the second table of corrected alpha values based on the correction parameter m.

Table A below shows one way to load the tables for m=1/2, that is, for sampling at twice the rate at which alpha values were computed in the volume.

Table A

Example Table of Corrected Opacity Values

TABLE A

Example Table of Corrected Opacity Values.

| Table 1 | | $\alpha_{sample}$ | Table 2 | Table 1 | | $\alpha_{sample}$ | Table 2 | $\alpha_{sample}$ | Table 2 |
|---|---|---|---|---|---|---|---|---|---|
| Shift: | 7 | 0 | 2048 | Shift: | 3 | 3840 | 3278 | | x |
| Offset: | 0 | 128 | 2064 | Offset: | 32 | 3848 | 3288 | | x |
| Shift: | 7 | 256 | 2081 | | | 3856 | 3299 | | x |
| Offset: | 2 | 384 | 2098 | | | 3864 | 3310 | | x |
| Shift: | 7 | 512 | 2116 | | | 3872 | 3321 | | x |
| Offset: | 4 | 640 | 2135 | | | 3880 | 3332 | | x |
| Shift: | 7 | 768 | 2154 | | | 3888 | 3344 | | x |
| Offset: | 6 | 896 | 2174 | | | 3896 | 3356 | | x |
| Shift: | 7 | 1024 | 2195 | | | 3904 | 3369 | 4072 | 3810 |
| Offset: | 8 | 1152 | 2217 | | | 3912 | 3381 | 4073 | 3816 |
| Shift: | 7 | 1280 | 2239 | | | 3920 | 3394 | 4074 | 3822 |
| Offset: | 10 | 1408 | 2263 | | | 3928 | 3408 | 4075 | 3828 |
| Shift: | 7 | 1536 | 2288 | | | 3936 | 3422 | 4076 | 3835 |
| Offset: | 12 | 1664 | 2313 | | | 3944 | 3436 | 4077 | 3841 |
| Shift: | 7 | 1792 | 2341 | | | 3952 | 3451 | 4078 | 3848 |
| Offset: | 14 | 1920 | 2369 | | | 3960 | 3467 | 4079 | 3855 |
| Shift: | 7 | 2048 | 2400 | | | 3968 | 3483 | 4080 | 3862 |
| Offset: | 16 | 2176 | 2431 | | | 3976 | 3499 | 4081 | 3870 |
| Shift: | 7 | 2304 | 2465 | | | 3984 | 3517 | 4082 | 3878 |
| Offset: | 18 | 2432 | 2502 | | | 3992 | 3535 | 4083 | 3886 |
| Shift: | 7 | 2560 | 2541 | | | 4000 | 3555 | 4084 | 3894 |
| Offset: | 20 | 2688 | 2582 | | | 4008 | 3575 | 4085 | 3903 |
| Shift: | 7 | 2816 | 2628 | | | 4016 | 3596 | 4086 | 3913 |
| Offset: | 22 | 2944 | 2677 | | | 4024 | 3619 | 4087 | 3923 |
| Shift: | 7 | 3072 | 2731 | | | 4032 | 3644 | 4088 | 3933 |
| Offset: | 24 | 3200 | 2791 | | | 4040 | 3671 | 4089 | 3945 |
| Shift: | 7 | 3328 | 2859 | | | 4048 | 3700 | 4090 | 3958 |
| Offset: | 26 | 3456 | 2936 | | | 4056 | 3732 | 4091 | 3972 |
| Shift: | 6 | 3584 | 3027 | | | 4064 | 3768 | 4092 | 3988 |
| Offset: | 28 | 3648 | 3079 | | | 4072 | 3810 | 4093 | 4007 |
| | | 3712 | 3137 | | | 4080 | x | 4094 | 4033 |
| | | 3776 | 3202 | | | 4088 | x | 4095 | 4096 |

The table above illustrates values for the 16 entry first level table and the 96 entry second level table, for a sampling ratio of 1/2, that is, for 2x supersampling, i.e., m=1/2.

The three columns labeled "Table 2" give the 96 values of $f_c$ that are stored in the second level table. Entries marked with an "x" are not used. The three columns labeled $\alpha_{sample}$ give the sample alpha values corresponding to the correction factors. The two columns labeled "Table 1" specify shift and offset values for 16 first level tables. The solid boxes associate these values with the portion of the second level that that they reference. Note that $\alpha_{sample}$ values have the range 0..4095, where 4095 represents a totally opaque sample. However, the correction factors in this table have the range 0..4096. This makes multiplication simpler than if the correction factors used a range of 0..4095.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for correcting opacity values of samples in a rendering pipeline, comprising:

partitioning a range of uncorrected alpha values into a plurality of segments in a low to high order;

determining corrected alpha values for uncorrected alpha values in the highest segment by direct table look-up; and determining corrected alpha values for uncorrected alpha values in all but the highest segment by linear interpolation.

2. The method of claim 1 wherein a number of first table entries used to interpolate the corrected opacity is dependent on a relative linearity of the corrected opacity value near the uncorrected opacity value.

3. The method of claim 2 wherein the number of first table entries is two if the corrected opacity value near the uncorrected opacity value is substantially linear.

4. The method of claim 2 wherein a range of opacity values from zero to the threshold opacity value is partitoned into a plurality of segments, and further comprising storing first table entries for each of the plurality of segments.

5. The method of claim 4 wherein the range of opacity values is partitioned into sixteen segments.

6. The method of claim 3 wherein a predetermined high number bits of the uncorrected opacity value are used to index the first table entries of each of the plurality of segments.

7. The method of claim 1 wherein the first and second table entries are loaded for the predetermined sampling spacing ratio.

8. The method of claim 7 wherein ninety-six second table entries are loaded.

9. The method of claim 1 wherein the corrected opacity value is based on $\alpha_{corrected} = f_c \times \alpha_{uncorrected} \times 1-(1-\alpha_{uncorrected})^m$ where m is the predetermined sampling spacing ratio, and $$f_c = \frac{1-(1-\alpha_{uncorrected})^m}{\alpha_{uncorrected}}.$$

10. An apparatus for correcting opacity values of samples in a rendering pipeline, comprising:

means for partition a range of uncorrected alpha values into a plurality of segments in a low to high order;

means for determining corrected alpha values for uncorrected alpha values in the highest segment by direct table look-up; and means for determining corrected alpha values for uncorrected alpha values in all but the highest segment by linear interpolation.

11. A compositing stage of a graphics rendering pipeline for rendering graphics data as an image, comprising:

means for partition a range of uncorrected alpha values into a plurality of segments arranged in a low to high order; and means for determining corrected alpha values for the uncorrected alpha values in all but the highest segment by linear interpolation to approximate a highly non-linear exponential opacity correction function.

12. The compositing stage of claim 11 further comprising:

means for determining corrected alpha values for the uncorrected alpha values in the highest segment by table look-up.

13. The compositing stage of claim 11 wherein the uncorrected opacity values are provided in a pipelined manner, and the uncorrected opacity values are determined in a pipelines manner.

14. The compositing stage of claim 11 wherein the uncorrected alpha values are associated with samples of the graphics data.

15. The compositing stage of claim 11 wherein the samples are interpolated from voxels.

16. The compositing stage of claim 11 wherein the linear interpolation is dependent on a sampling spacing ratio.

17. The compositing stage of claim 11 wherein the means for determining includes means for shifting the uncorrected opacity values.

18. The compositing stage of claim 17 wherein low order bits of the shifted uncorrected opacity values determine weights for the linear interpolation.

19. The compositing stage of claim 11 wherein the corrected opacity values are applied to opacity weighted color samples of the graphics data.

20. The compositing stage of claim 19 further comprising:

means for dividing the opacity weighted color samples by the uncorrected opacity values; and means for multiplying the opacity weighted color samples by the corrected opacity values.

* * * * *